United States Patent
Rabin et al.

(10) Patent No.: US 9,744,944 B2
(45) Date of Patent: Aug. 29, 2017

(54) WINDSHIELD WIPER IMMOBILIZATION DEVICE

(71) Applicants: Isaac M. Rabin, Atlanta, GA (US); Louis F. Polk, III, Excelsior, MN (US)

(72) Inventors: Isaac M. Rabin, Atlanta, GA (US); Louis F. Polk, III, Excelsior, MN (US)

( * ) Notice: Subject to any disclaimer, the term of this patent is extended or adjusted under 35 U.S.C. 154(b) by 0 days.

(21) Appl. No.: 13/998,323

(22) Filed: Oct. 21, 2013

(65) Prior Publication Data
US 2014/0041144 A1 Feb. 13, 2014

Related U.S. Application Data

(63) Continuation-in-part of application No. 13/136,242, filed on Jul. 27, 2011, now Pat. No. 8,893,349.

(51) Int. Cl.
*B60S 1/04* (2006.01)
(52) U.S. Cl.
CPC ................... *B60S 1/0491* (2013.01)
(58) Field of Classification Search
CPC ..... B60S 1/0491; B60S 1/0452; B60S 1/0469
USPC .... 15/250.001, 257.01, 250.16, 250.19, 268; 248/205.7, 206.2, 309.3, 363; 294/185; 156/94; 425/12, 13
See application file for complete search history.

(56) References Cited

U.S. PATENT DOCUMENTS

| | | | | |
|---|---|---|---|---|
| 1,687,412 A * | 10/1928 | White, Jr. | ................... | 15/250.16 |
| 2,306,980 A * | 12/1942 | Roberts | ...................... | 15/250.19 |
| 5,104,304 A * | 4/1992 | Dotson | ............................ | 425/12 |
| 6,390,424 B1 * | 5/2002 | Kidushim et al. | ......... | 248/122.1 |
| 7,503,540 B2 * | 3/2009 | Hood | ............................ | 248/537 |

* cited by examiner

*Primary Examiner* — Andrew A Horton
(74) *Attorney, Agent, or Firm* — Denton Intellestual Property Law Firm, LLC; F. Russell Denton, Esq.

(57) ABSTRACT

The invention provides an apparatus to hold one or more windshield wipers stationary against a vehicle window. The apparatus comprises a window placement module comprising a vacuum cup that has a vacuum zone and an attachment means that is located at a point on the cup other than within the vacuum zone. The attachment means is linked to a first point of an arm that comprises a constraint feature to hold a windshield blade in place and further comprises a leverage feature to raise or lower the height of the constraint feature relative to the first point of the arm.

20 Claims, 3 Drawing Sheets

Caricature of an upper view of an illustrative, non-exclusive embodiment of a device according to the invention.

FIGURE 1: Caricature of an upper view of an illustrative, non-exclusive embodiment of a device according to the invention.
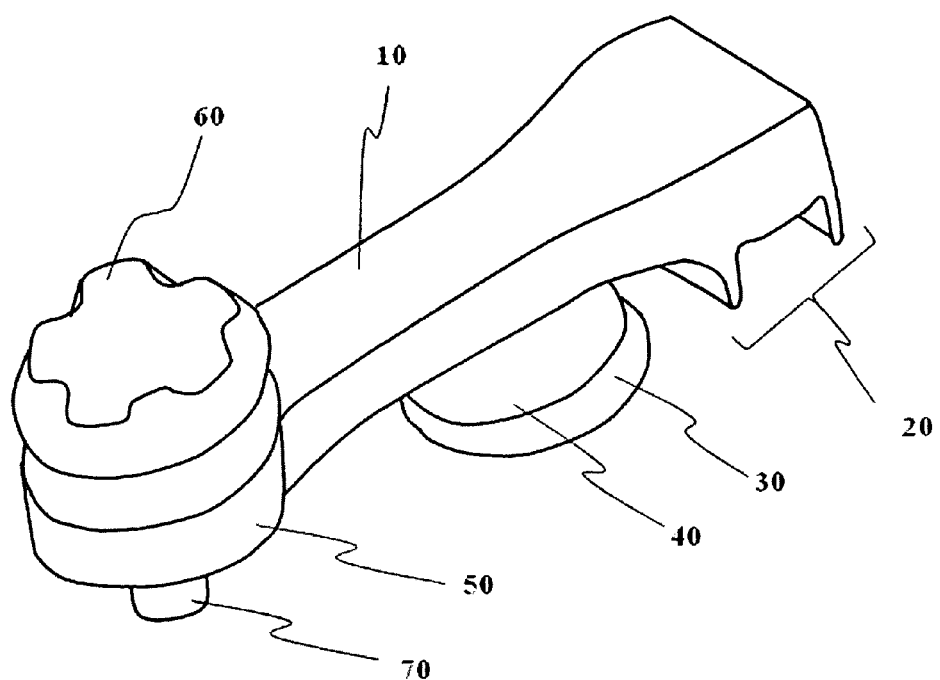

FIGURE 2: Caricature of a side view of an illustrative, non-exclusive embodiment of a device according to the invention
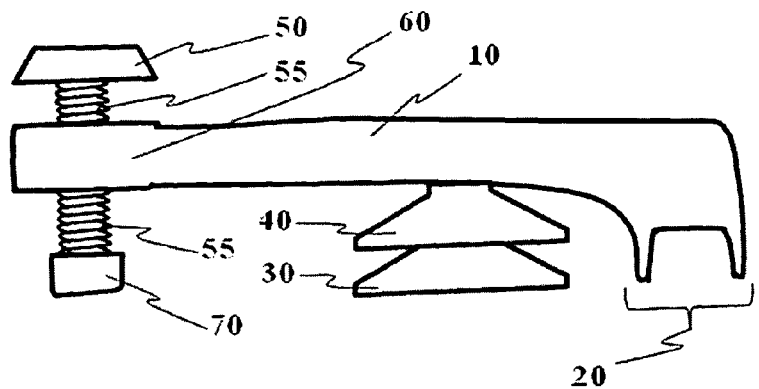

FIGURE 3: Caricature of an exploded view of an illustrative, non-exclusive embodiment of a device according to the invention.
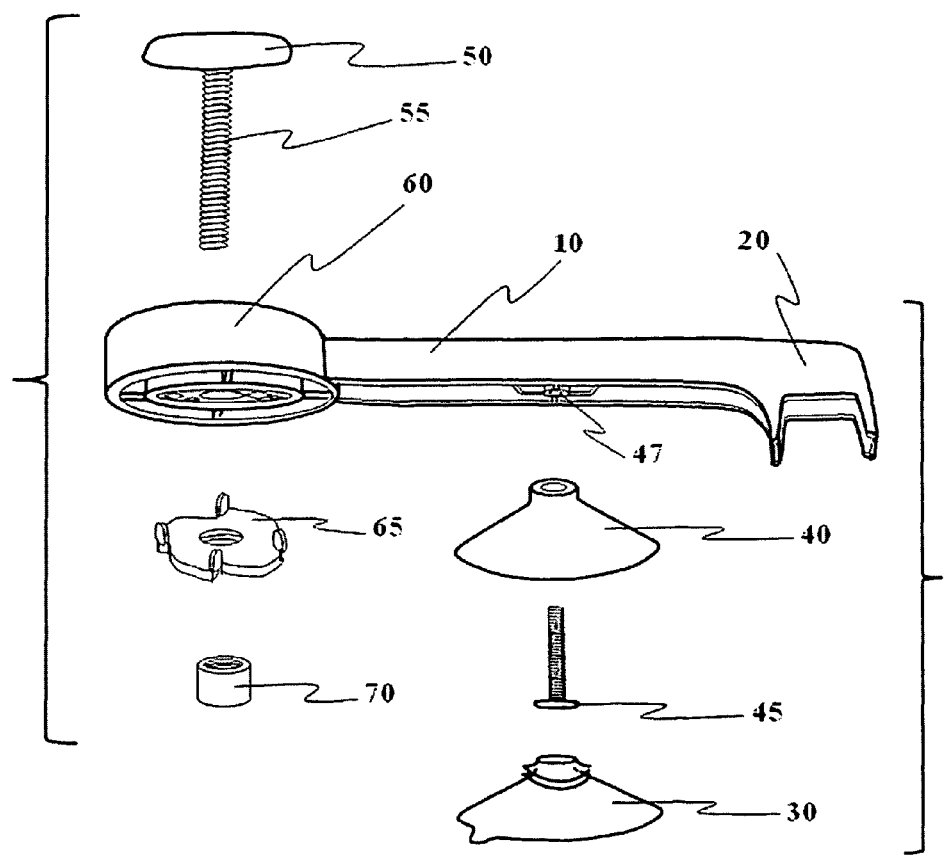

WINDSHIELD WIPER IMMOBILIZATION DEVICE

PRIORITY APPLICATIONS

This application is a continuation-in-part of copending U.S. patent application Ser. No. 13/136,242, filed Jul. 27, 2011 and entitled "Windshield Blade Locking Mechanism".

FIELD OF THE INVENTION

The invention pertains to devices for securing windshield wipers in a locked position against a windshield.

BACKGROUND

Windshields, also known as windscreens, are among the most important safety elements in vehicles because they are the windows through which drivers view most traffic. Thus an essential function is provided when wipers clear these windows of rain, dew, dust, heavy pollen, insect residues, bird droppings, and fallen botanical detritus. Typical wipers are loosely stationary when at rest; this is helpful for accommodating their free wiping movement when the wiper is activated, but also causes inconveniences that in some cases pose a safety hazard.

Because of the loose character of wipers at rest, enterprising persons commonly place unsolicited coupons, advertisements, promotional flyers, or other unwanted literature under the windshield wipers of unattended automobiles that are in parking lots or along the edges of streets. Those papers must be removed before safe driving can ensue, indeed if the papers are torn off by the slipstream while the vehicle is in transit they represent a potential hazard for other drivers, also. However drivers who return to their vehicles after such papers are placed may not notice them until the vehicle is already moving along a highway or surface street at a high speed, when they flap in a distracting way but it is no longer convenient to reach out to remove the offending document or when the vehicle is no longer in a safe neighborhood. The failure to notice such literature before departing from the parking spot is particularly common after dark.

In addition, vandals commonly steal windshield wiper blades or the wiper arm itself. The easy deconstruction of the blade assembly and loose placement of the wiper assembly allows this to be done quickly and without the perpetrators drawing attention to themselves. It can be surprisingly expensive for the true owner to replace those parts. And when such thefts occur shortly before an owner must drive the vehicle to an appointment in a downpour or ice storm along a route where windshield wipers cannot be bought conveniently, the owners must often choose between the enhanced risk of driving and the consequences of missing the appointment.

Moreover, the looseness of the wiper assembly also allows leaves, pine needles and other natural detritus to accumulate at the interface of the windshield and wiper blade; the debris is commonly then pinned between the windshield and the wiper blade due to a slight excess in the blade's arch. When the wiping mode is activated while such debris is trapped there, the sweep of the blade is far less efficient at removing water or ice from the windshield, substantially compromising visibility for driving. And detritus that is carried along beneath the wiper blade in the sweep of the wiper also increases the wear on the blade, shortening its useful lifecycle. This affects both the cost and the safety of their use.

Thus there is an important ongoing need for means to constrain windshield wipers in a fixed position when vehicles are parked.

SUMMARY OF THE INVENTION

The invention provides an apparatus to hold a windshield wiper stationary against a vehicle window. The apparatus comprises a vacuum cup attached to a first point of an arm that constrains a windshield wiper at another point and to which torque can be applied by a leverage feature.

In certain embodiments the invention provides a windshield wiper immobilization device comprising:
  a) a vacuum cup comprising a vacuum zone;
  b) an attachment means that is linked to the vacuum cup at a position other than within the vacuum zone; and
  c) an arm that is linked to the attachment means of the vacuum cup at a first point of the arm;
wherein the arm further comprises a constraint feature to hold a windshield wiper in place and further comprises a leverage feature to raise or lower the height of the constraint feature relative to the first point of the arm.

In some embodiments the device has one or more of the following features:
  a circular vacuum zone of 0.2 to 6 inches in diameter within the vacuum cup;
  attachment of the vacuum cup to the arm by means of a screw, bolt, rivet, dowel, hinge clip, ring, clamp or cotter pin;
  a modality for conveniently breaking the vacuum;
  a pivotable connection between the arm and vacuum cup;
  a means for extending the length of the arm;
  a saddle shape for the constraint feature that enables it to straddle the wiper;
  bracketing aspects in the constraint feature that enable it to prevent lateral motion of the wiper;
  a tightening means to apply torque on the arm such as by a screw, bolt, spring clip, ratcheting trigger or quick-release pin.

BRIEF DESCRIPTION OF THE DRAWINGS

FIG. 1 is a caricature of an upper view of an illustrative, non-exclusive embodiment of a device according to the invention.

FIG. 2 is a caricature of a side view of an illustrative, non-exclusive embodiment of a device according to the invention.

FIG. 3 is a caricature of an exploded view of an illustrative, non-exclusive embodiment of a device according to the invention.

DETAILED DESCRIPTION OF THE INVENTION

Definitions

The terms "windshield" and "windscreen" as used herein are synonymous and have their usual and customary meaning in the art of motorized vehicles.

The term "windshield wiper" as used herein has its common and ordinary meaning in the art. As commonly designed windshield wipers comprise a flexible wiper blade, a stiff spine piece that holds the blade in a roughly liner or pre-defined curvilinear shape, a wiper arm, and hardware for attaching the spine to the wiper arm; typically a dedicated motor controls the movement of each wiper arm from a base location near an edge of the windshield. The present invention is not, however, limited by the design of the windshield wipers that are constrained.

The term "windshield wiper immobilization device" as used herein refers to an apparatus for retaining a windshield wiper in a stationary position against a windshield.

The term "vacuum cup" as used herein has its common and ordinary meaning in the art. It is used synonymously herein with the term suction cup. And it includes vacuum cups of any design that is suitable for forming a vacuum seal with another surface such as by the application of force to expel air from beneath a monolithic cup, or by application of reduced pressure from a manually or electrically powered vacuum pump. Optionally the vacuum cup may be further provided with a rigid conical ceiling piece to provide shelter for the vacuum cup from the elements and or enhance the uniformity of application of top-down pressure on the vacuum cup.

The term "vacuum zone" as used herein refers to the surface of a vacuum cup that is capable of forming a vacuum seal between a vacuum cup's working surface—i.e., the side facing a vehicle window—and a juxtapositioned window surface. The vacuum zone may be circular in shape or have any other shape that is not inconsistent with forming a vacuum. In many cases it is desirable for the vacuum zone to occupy and be defined by the great majority of the working surface of a vacuum cup, but the invention is not so limited. In certain embodiments the vacuum zone is about 0.2 to 6 inches in diameter but the invention is not so limited.

The term "attachment means" as used herein with respect to a vacuum cup refers to a means for attachment to a vacuum cup at a location other than within its vacuum zone. A non-limiting illustrative list of attachment means as contemplated herein comprises screws (screwed into an eye in the upper surface of the cup), bolts (bolted into an eye in the upper surface of the cup), rivets (passing through a portion of a feature on the upper surface of the cup), dowels (having one end in a close-fitting hole defined by the upper surface of the cup), hinges (wherein a hinge pin pierces at least one portion of a feature on the upper surface of the cup), clips (piercing or gripping a portion of a feature on the upper surface of the cup), rings (passing through a portion of a feature on the upper surface of the cup), clamps (gripping a portion of a feature on the upper surface of the cup), cotter pins (piercing and or gripping a feature on the upper surface of the cup), but any other means for attaching flexible compositions to other hardware may suffice. Attachment means may optionally be glue or may be hardware that is glued to a vacuum cup. For instance during installation in a threaded or smooth bore orifice on the upper structure of a vacuum cup, a dowel or bolt may bear a polycyanoacrylate-based glue to enhance the strength of the connection. Attachment means may further comprise a handle to facilitate physical manipulation of the means or the device.

The term "separably attached" as used herein with respect to a distinct part relative to a second part means that the attachment of the distinct part is readily reversible, i.e., that the distinct part may be readily removed from the second part without damage to either.

The term "arm" as used herein with respect to a windshield wiper immobilization device refers to a component that is attachable to a vacuum cup at a first point of the component, that further comprises a constraint feature for holding a windshield blade immobile and a leverage feature for applying torque to raise or lower the constraint feature when the immobilization device is in use on a vehicle window or other vehicle surface. In some embodiments the arm, constraint feature and leverage feature together represent a single part. In other embodiments at least one of the constraint feature and leverage feature respectively comprises at least one distinct part that is separably attached to the rest of the arm. Non-limiting illustrative examples of such separable attachment include: attachment by threaded means such as by screwing in; rivets; dowels; hinge pins; cotter pins; spring clips; clamps; tabs; pressure fits; quick-release pins; glue; and the like. In some embodiments the arm is extendible, e.g., by means of two parts that are independently slide-able within an outer sleeve or alternatively two parts that are independently slide-able along a rod that runs through them.

The term "extending" and "shortening" as used herein with respect to an arm refers to an arm that can be lengthened or shortened by a mechanical adjustment. A non-limiting illustrative examples of such adjustable arms is an arm design comprising an inner member and an outer sleeve that are slidably disposed relative to one another, but which can be fixed in place relative to one another such as by means of a cotter pin or other fixing means.

The term "constraint feature" as used herein refers to a feature comprised by the immobilization arm which when applied hinders a windshield wiper from moving in one or more directions. The constraint feature may be configured in a saddle shape, inverted "U" shape, or other shape that facilitates straddling and or gripping of a windshield wiper when applied. In some embodiments the constraint feature is an inseparable part of the arm, such as a molded feature on an arm that is comprised of plastic, metal, ceramic or other moldable material. In alternative embodiments the constraint feature is separably attached to the rest of the arm or may comprise one or more parts that is separably attached to the rest of the arm. In some embodiments the constraint feature is configured such that when applied it prevents the wiper from being lifted. In certain embodiments the constraint feature is configured such that when applied it prevents the wiper from being moved laterally across the windshield surface. In particular embodiments the constraint feature is configured such that when applied it prevents the wiper from being moved along the axis defined by the wiper's longest dimension.

The term "leverage feature" as used herein refers to a feature comprised by the immobilization arm which when applied increases the amount of force that is applied by the immobilization arm to hold a windshield wiper against a windshield. In some embodiments the leverage feature is an inseparable part of the arm, such as a molded feature on an arm that is comprised of plastic, metal, ceramic or other moldable material. In alternative embodiments the constraint feature is separably attached to the rest of the arm or may comprise one or more parts that is separably attached to the rest of the arm. In certain embodiments the leverage feature is configured such that when applied it applies torque to the arm by means of screw-wise motion. In particular embodiments the leverage feature is configured such that when applied it applies torque to the arm by means of ratchet-wise motion. In further embodiments torque is applied by means of the leverage feature by means of a spring clip or a quick-release pin (such as is used for rapid mounting and removal of bicycle wheels).

The term "maximum lifting capacity (MLC)" as used herein refers to the maximum amount of force that can be applied by the vacuum cup before the vacuum is broken, or that can be applied by a leverage feature before it becomes structurally compromised (e.g., by stripped threads on a bolt when torque is applied by screw-wise tightening). The maximum lifting capacity of the leverage feature may be greater than, less than or the same as that of the vacuum cup.

Illustration from the Figures

Features of the invention may be understood by reference to a non-exclusive illustrative embodiment depicted in caricature by the drawings.

FIG. 1 depicts a view from above of an embodiment of the invention in which is provided a vacuum cup (30) of suitable size, shape, flexibility and composition to permit and maintain attachment to a vehicle window surface by means of a reduced atmospheric pressure between the window surface and a lower surface of the cup. Thus here a vacuum zone is located on the underside of the cup here. In this embodiment an upper surface of the cup—i.e., a surface that is not within the cup's vacuum zone—may be attached to a component above it by means of a flange, tab, screw fit or other mechanical attachment means that is a part of the unitary vacuum cup, or the cup may attach to other components via an attachment means such as a screw, bolt, rivet, pin or dowel, or other independent attachment means. Shown immediately above the cup is an optional shroud or other cover (40) that may be used to protect the upper surface of the vacuum cup (e.g., to avoid accelerated drying and weakening of the vacuum cup in direct sunlight) or to distribute pressure across one or more upper surfaces of the vacuum cup. In the depicted embodiment the cup and optional cover are linked to an arm's middle section (10); the point of linkage may be anywhere within that section and for purposes of this discussion is referred to here as a first point of the arm. Additionally the arm has a constraint feature (20) in the shape of an inverted U, in order to saddle and thus limit the vertical and lateral movement of a windshield wiper arm relative to a windshield on which the invention is used. And the arm has a leverage feature to raise or lower the height of the constraint feature, whereby the top of the vacuum cup (and optionally also its cover) serves as a fulcrum for leverage after a seal has been applied to the window by means of suction at the vacuum zone. In the particular embodiment depicted in FIG. 1 a leverage zone (50) of the arm defines a threaded orifice through which passes a threaded means such as a screw or bolt that can be tightened or loosened to respectively raise or lower the leverage zone relative to the windshield surface and relative to the fulcrum. Also depicted are a handle (60) to twist and apply pressure on the tightening means, as well as an end cap (70) to prevent the end of the tightening means from marring the surface of the windshield.

The caricature in FIG. 2 depicts essentially the same embodiment as does FIG. 1, except that FIG. 2 depicts a side view. The enumeration for components is like that discussed above. I.e., the device comprises vacuum cup 30, its optional covering 40, both being attached to an arm's middle section 10, where the arm has a constraint feature 20 at one end and a leverage zone 60 at the other. However the threaded leverage means 55 that passes through the arm's leverage zone 60 is visible in FIG. 2, as is its attachment to a topside handle 50 for tightening and an underside cap 70 for protecting the windshield.

The invention may be further understood by consideration of the non-exclusive illustrative embodiment depicted in FIG. 3 in an exploded view. Here the arm is shown from one side with a foreshortened view of the underside. Below the arm's middle section 10 is depicted a receiving feature 47 for a bolt. In this instance the arm is shown as for a hollow molded plastic component and the receiving feature is shown with buttress elements in a cross shape. The underside of the arm's leverage zone 60 has similar buttress elements in its hollow form as seen from below. The constraint feature 20 in the shape of an inverted U is also evident. The threaded portion of bolt 45 passes through the optional cover 40 and into the arm's respective receiving feature 47; in this embodiment the head of the bolt is fixed and prevents the cover from becoming detached. The vacuum cup 30 has an optional tab at a lower corner for prying up the vacuum cup to break the suction seal with the windshield when the invention device is removed. Furthermore the vacuum cup 30 has a one or more flanges at its upper end for attaching the cup to the underside of the cover. As for the leverage zone 60, a threaded item 55 having a handle 50 passes through an orifice defined by the leverage zone 60. The orifice may be threaded or not. In the embodiment shown an optional washer or locknut 65 may be placed at and immobilized in the lower portion of the leverage zone 60 by means of tabs or other shape fitting. The optional washer or locknut receives and is penetrated by the threaded item 55. Finally, an underside cap 70 may be placed on the bottom end of the threaded item 55 either by a friction fit or a threaded fit.

In particular embodiments the suction of the applied vacuum cup may be enhanced by the use of a peripheral vacuum source such as a manually powered pump or electrically powered pump.

Components

A vacuum cup, sometimes known as a suction cup or sucker, uses negative fluid pressure of air or water to adhere to surfaces; such cups adhere especially well to nonporous surface. Generally the working face (defined herein as the vacuum zone) of the vacuum cup has a curved surface. When the center of the suction cup is pressed against a relatively flat smooth surface, the volume of the space between the suction cup and the flat surface is reduced, which causes the air or fluid between the cup and the surface to be expelled past the rim of the cup. When the user ceases applying pressure, the cup's elastic composition tends to resume its original shape. Because all of the air or fluid has already been forced out of the inside of the cup, the cavity developed between the cup and the flat surface has little to no air or water in it, and thus lacks pressure. The difference between atmospheric pressure on the outside and the low-pressure cavity on the inside of the cup sustains the adhesion. The duration of the effect is a function of how effectively leaks from the outside atmosphere are controlled.

The vacuum cup may be comprised of any suitable flexible material and are widely available. For instance, suitable vacuum cups are sold by SAS Automation (see http://www.sasgripper.com/product_sections/section_vacuum_cups.htm). Particularly suitable materials for the vacuum cup include chloroprene, polyurethane, nitrile rubber, silicone rubber, and Viton®. Chloroprene has good wear resistance, and is useful in the temperature ranges −40° to 230° F. (−40° to 110° C.). Polyurethane has excellent wear resistance, a very long life, is oil resistant, and is useful in the temperature ranges −58° to 248° F. (−50° to 120° C.). Softer polyurethanes may be used but are best on textured surfaces whereas a windshield is smooth Nitrile rubber has good wear resistance properties, is oil resistant, and is useful in the temperature ranges −20° to 225° F. (−50° to 120° C.). Silicone rubber is a soft material, is especially good for rough and textured surfaces, and is useful in the temperature ranges −86° to 392° F. (−65° to 200° C.). Note that windshields are exposed to both the hottest summer conditions and coldest winter conditions, thus the extremes of temperature noted here are relevant to choice of material.

The design of the vacuum cup may be of any type known in the art that is suitable for sustaining suction. Suitable suction cup designs include but are not limited to a flange type, a bellows cup type, a snap on or bolt type, and a push on or clamp type.

The force of a vacuum cup when in use follows the relationship F=AP, where F=force, A=area, and P=pressure. For example, for a cup of radius 2.0 cm and area $\pi(0.020 \text{ m})^2$=ca. 0.0013 square meters, the result is F=(0.0013 m$^2$)(100,000 Pa)=ca. 130 Newtons, assuming the pressure inside the cup is negligible when compared to atmospheric pressure. However the calculation requires more finesse. The specifications for sizing vacuum cups additionally focus upon lift capacity and the margin of safety. Suitable lift capacity at sea level is determined by the following theoretical relationship; actual lift capacities should be determined empirically.

$$C = \frac{0.393 \times D^2 \times V}{N}$$

C=Lifting Capacity (lbs.)
D=Cup Diameter (in.)
V=Vacuum Level (in Hg)
N=Desired Safety Factor (≥2 for horizontal lifting; ≥4 for vertical lifting)

$$D = 1.61 \times [(M \times N)/(V \times U)]^{1/2}$$

D=Diameter of vacuum cup (in.)
M=Mass of lifting product (lbs. of force to be applied)
V=Vacuum Level (in mm Hg)
N=Safety Factor (≥2 for horizontal lifting; ≥4 for vertical lifting)
U=Number of Cups For the present invention a circular vacuum zone having a circumference D of about 4±2 inches (i.e., ~50±25 mm) has been found to be useful; other useful ranges are 4±1 inches, and more particularly about 4 inches. A manually-attainable maximum lifting capacity C is desirable (e.g., in the range of 5-50 lbs., or alternatively 10-40 lbs, or alternatively 20-30 lbs., or alternatively about 25 lbs.). The lifting capacity can be higher for instance if the cup is fitted with a stopcock to allow air in when desired or is equipped with an optionally removable lever that permits greater force to be applied on one side to break a static vacuum seal and disengage the cup. A safety factor N of 1 or 2 is particularly useful but alternatively N may be 3 or 4. For purposes of the calculation, the lifted mass M may be the same as C. The figures in this section assume the use of a single vacuum cup (i.e., U=1) however a plurality of cups may be used to obtain a comparable result.

The maximum lifting capacity (MLC) of the leverage feature depends on the design and mechanism type of that feature and may be less than, greater than or equal to that of the vacuum cup. Where the leverage feature's MLC exceeds that of the vacuum cup, the leverage feature can be used to break the vacuum once applied. Where the leverage feature's MLC is less than that of the vacuum cup, torque applied to the leverage feature using the arm's attachment to the vacuum cup as a fulcrum will only increase the force applied to lock the wiper blade in place without breaking the vacuum of the vacuum cup.

The arm, optional cover for the vacuum cup, threaded items, handle for the leverage feature, any end cap for the threaded items, and any other separably attached parts of the constraint feature and leverage feature may be independently comprised of one or more hard materials. Examples of suitable hard materials include metals, tough plastics and tough ceramics. Non-limiting illustrative metals include aluminum and iron. Non-limiting illustrative tough plastics include nylons, polyaramides, ABS rubber, and the like. Non-limiting illustrative tough ceramics include: silicon carbide that has been sintered as a laminate with graphite; alumina derivatives co-developed by William Predebon at Michigan Technological University; nacre-like biomimetic materials such as those co-developed by Robert Ritchie in the Department of Materials Science and Engineering at the University of California at Berkeley, and nacre-like biomimetic materials such as those co-developed by Antoni P. Tomsia, Sylvain Deville and colleagues at Lawrence Berkeley National Laboratory.

In order to minimize marring of windshields on which the invention is placed, any end cap for a threaded items may optionally be soft, such as an elastomer, a firm plastic with a low glass transition temperature, a cross-linked rubber, a non-cross-linked rubber, or other soft materials. Suitable but non-limiting illustrative soft materials for this purpose include silicon rubber, polyurethane, acrylonitrile-butadiene rubbers, polyolefin plastics, nitrile rubber, viton, chloroprene, and neoprene.

VARIATIONS

Although specific embodiments of the present invention have been described above in detail, the description is merely for purposes of illustration. In addition to the embodiments above various modifications of, and equivalent elements corresponding to, the disclosed aspects of the exemplary embodiments, can be made by those of ordinary skill in the art without departing from the spirit and scope of the present invention defined in the following claims, the scope of which is to be accorded the broadest interpretation so as to encompass such modifications and equivalent structures.

We claim:

1. A combination comprising a windshield wiper and a windshield wiper immobilization device, wherein the immobilization device comprises:
    a) a vacuum cup comprising a vacuum zone;
    b) an attachment means that is linked to the vacuum cup at a position other than within the vacuum zone; and
    c) an arm that is linked to the attachment means of the vacuum cup at a first point that is between a constraint feature and a leverage feature of the arm;
    wherein the constraint feature holds the windshield wiper in place and the leverage feature raises or lowers the height of the constraint feature relative to the first point of the arm; and
    wherein when the immobilization device of the combination is in use the constraint feature of the arm holds the windshield wiper of the combination in a stationary position against a vehicle window, and the leverage feature of the arm increases the amount of force with which the constraint feature holds the windshield wiper against the window, and the arm's attachment to the vacuum cup serves as a fulcrum for directing force along the arm from the leverage feature to the constraint feature.

2. The combination of claim 1 wherein the vacuum zone is circular and has a diameter selected from the range of 0.2 inches to 6 inches.

3. The combination of claim 1 wherein the attachment means is one of the group consisting of a flange, mechanical tab, screw, bolt, rivet, dowel, hinge, clip, ring, clamp, cotter pin and glue.

4. The combination of claim 3 wherein the attachment means is one of a screw, bolt, rivet and dowel, and is linked at a first end to the vacuum cup and at a second end to an arm or to an intermediate component that is attached to an arm.

5. The combination of claim 1 wherein the vacuum cup is equipped with a vacuum-breaking modality selected from: (a) a stopcock that can be opened to allow air to enter the vacuum zone or (b) a tab or lever that can be pried to lift an edge of the vacuum cup to allow air to enter the vacuum zone.

6. The combination of claim 1 wherein the arm is pivotably attached by the vacuum cup's attachment means.

7. The combination of claim 1 wherein the arm is non-pivotably attached by the vacuum cup's attachment means.

8. The combination of claim 1 wherein the arm comprises a means for extending or shortening the length of the arm.

9. The combination of claim 8 wherein an extendible arm comprises an inner member and an outer sleeve that are slidably disposed relative to one another.

10. The combination of claim 1 wherein the constraint feature comprises at least one distinct part that is separably attached to the arm.

11. The combination of claim 10 wherein the distinct part is separably attached by means of one of a screw, rivet, dowel, hinge pin, cotter pin, spring clip, clamp, tab, pressures fit, quick release pin, and glue.

12. The combination of claim 1 wherein the leverage feature comprises at least one distinct part that is separably attached to the arm.

13. The combination of claim 12 wherein the distinct part is separably attached by means of one of a screw, rivet, dowel, hinge pin, cotter pin, spring clip, clamp, tab, pressure fit, quick-release pin and glue.

14. The combination of claim 1 wherein the constraint feature is contoured in a saddle shape and is located astride the windshield wiper when applied.

15. The combination of claim 1 wherein the constraint feature brackets at least one side of the wiper when applied so as to inhibit lateral motion of the wiper.

16. The combination of claim 1 wherein the constraint feature bounds the top and sides of the windshield wiper when applied.

17. The combination of claim 1 wherein the leverage feature is selected such that its maximum lifting capacity is less than that of the vacuum cup.

18. The combination of claim 17 wherein the height of the arm's constraint feature above the windshield is adjustably fixed by raising or lowering the arm's leverage feature by a tightening means that is one of a screw, bolt, spring clip, ratcheting trigger and quick-release pin.

19. The combination of claim 1 wherein leverage feature is selected such that its maximum lifting capacity is greater than that of the vacuum cup.

20. The combination of claim 1 wherein the maximum lifting capacity of the vacuum cup is selected from the range of 5-50 pounds and the maximum lifting capacity of the leverage feature is at least 5 pounds.

\* \* \* \* \*